United States Patent
Zilavy et al.

(10) Patent No.: US 7,370,157 B2
(45) Date of Patent: May 6, 2008

(54) SYSTEMS AND METHODS OF SHARING REMOVABLE MEDIA STORAGE DEVICES IN MULTI-PARTITIONED SYSTEMS

(75) Inventors: Daniel V. Zilavy, Fort Collins, CO (US); Edward A. Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 11/135,706

(22) Filed: May 24, 2005

(65) Prior Publication Data
US 2006/0271736 A1 Nov. 30, 2006

(51) Int. Cl.
*G06F 12/00* (2006.01)
(52) U.S. Cl. ...................... 711/147; 711/111
(58) Field of Classification Search .......... 711/111
See application file for complete search history.

(56) References Cited

U.S. PATENT DOCUMENTS

| | | | |
|---|---|---|---|
| 6,003,068 A | 12/1999 | Sopko | |
| 6,490,648 B1 * | 12/2002 | Kaneda et al. | 711/4 |
| 6,542,965 B2 * | 4/2003 | Lesartre | 711/128 |
| 6,678,809 B1 * | 1/2004 | Delaney et al. | 711/162 |
| 6,718,372 B1 | 4/2004 | Bober | |
| 6,996,635 B2 * | 2/2006 | Goodman et al. | 710/5 |
| 7,203,944 B1 * | 4/2007 | van Rietschote et al. | 718/104 |

* cited by examiner

*Primary Examiner*—Matthew Kim
*Assistant Examiner*—Thanh D Vo

(57) ABSTRACT

Systems and methods of sharing removable media storage (RMS) devices in multi-partitioned systems are disclosed. An exemplary method may include receiving requests from a plurality of partitions of a processor to map at least one shared RMS device for the multi-partitioned system. The method may also include scheduling the requests if the shared RMS device is unavailable. The method may also include automatically mapping the at least one shared RMS device to the partitions one at a time as the at least one shared RMS device becomes available.

30 Claims, 6 Drawing Sheets

SYSTEMS AND METHODS OF SHARING REMOVABLE MEDIA STORAGE DEVICES IN MULTI-PARTITIONED SYSTEMS

TECHNICAL FIELD

The described subject matter relates to multi-partitioned systems, and more particularly to systems and methods of sharing removable media storage devices in multi-partitioned systems.

BACKGROUND

Server computers and even some personal computers (PCs) are commercially available which support multiple partitions, i.e., the ability to allocate processing resources on a central processing unit (CPU) to so called "partitions" each running an instance of an operating system (OS). The partitions may share fixed storage media, such as hard disk drives, by partitioning the fixed storage media and mapping each partition to its own disk partition to avoid conflicts with other partitions during data access operations. However, removable media storage (RMS) devices, such as, e.g., digital versatile disc (DVD) drives and digital audio tape (DAT) drives, cannot be readily partitioned for use by multiple partitions.

To enable sharing of RMS devices in multi-partitioned systems, the user has to physically interact with the RMS device. For example, the user may have to manually disconnect the RMS device from an input/output (I/O) port for one partition and reconnect it to a different I/O port for another partition. External patch panels may be provided to make it easier for the user to move the RMS device between partitions on an as-needed basis. However, both of these methods are time-consuming and error-prone (e.g., if the user connects the RMS device to the wrong I/O port or does not make a solid connection). In addition, the connectors may break or wear out. Alternatively, each partition needing access to removable media (e.g., a DVD) may be provided with a dedicated RMS device. However, this approach is expensive and space-intensive.

DETAILED DESCRIPTION

Briefly, sharing removable media storage (RMS) devices may be implemented in a multi-partitioned system according to the teachings herein. An exemplary multi-partitioned system may include virtual I/O controllers for each processor partition (or "partition"), linked over a switching fabric (e.g., Ethernet) to a management processor which interfaces with one or more shared RMS devices. The management processor may schedule or sequence access requests and maps the RMS devices to different partitions one at a time so that the RMS device can be shared. The shared RMS device may also be directly mapped to the management processor, e.g., for system-wide firmware updates using removable media and/or writing the system state information to removable media for troubleshooting or other purposes.

It is noted that operations described herein may be embodied as logic instructions on a computer-readable medium. When executed by one or more processing units, the logic instructions implement the described operations.

Exemplary System

Figure 1:
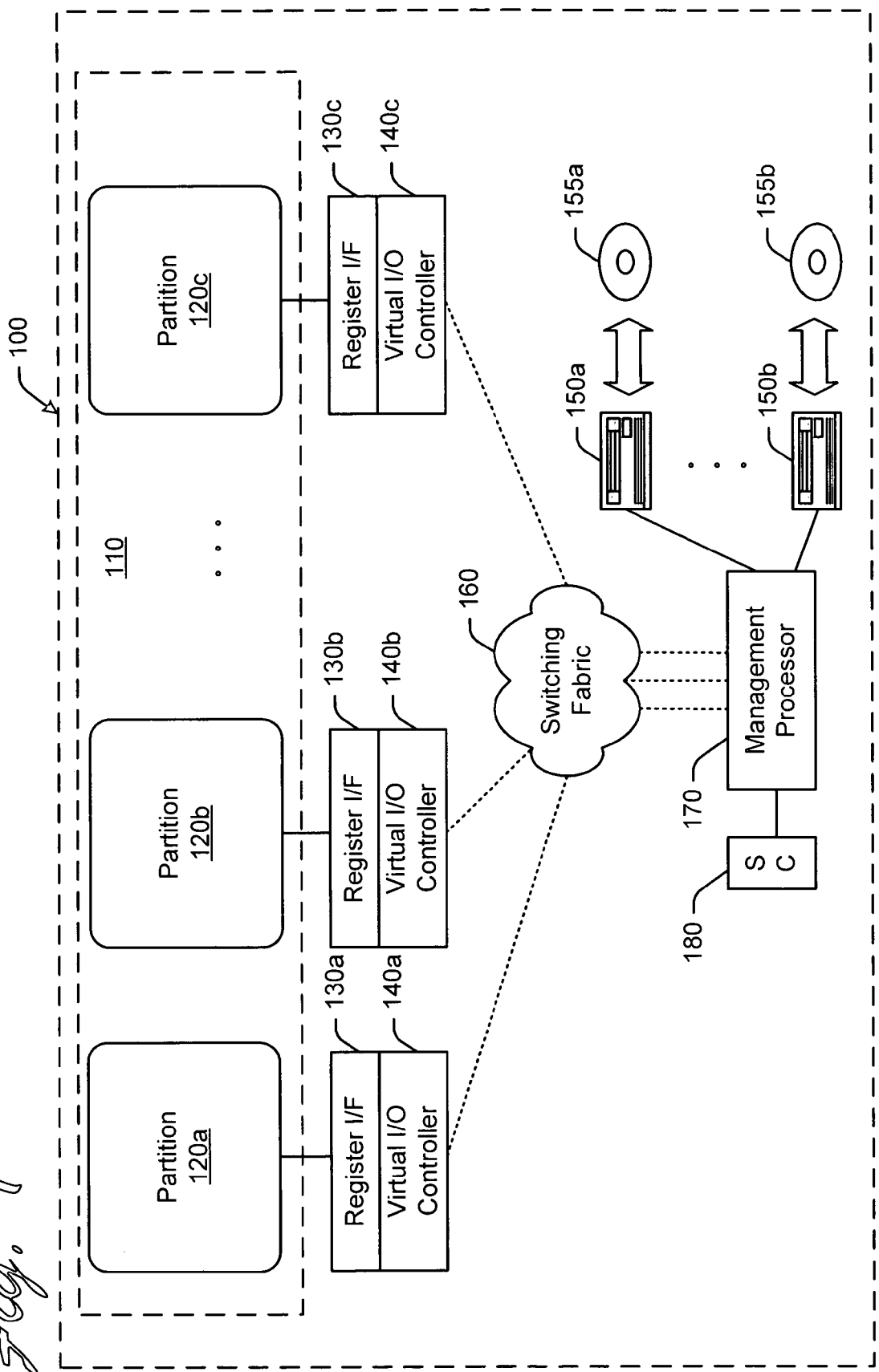
FIG. 1 is a high-level schematic diagram of an exemplary multi-partitioned system which implements shared removable media storage (RMS) devices.

FIG. 1 is a high-level schematic diagram of an exemplary multi-partitioned system which implements shared removable media storage (RMS) devices. Exemplary multi-partitioned system 100 may include one or more processors or processing units 110. Processing resources for processor 110 may be logically partitioned to form a number of partitions 120a-c (hereinafter also generally referred to as partition 120). Each partition 120 may run an instance of an operating system (OS) and be enabled to handle one or more processes at the same time other partitions 120 are processing transactions.

In an exemplary embodiment, partitions 120a-c are provided with register interfaces (I/F) 130a-c, respectively (hereinafter also generally referred to as register I/F 130). Register interface 130 may be implemented to the I/O ports of the partition 120 to the data path. In an exemplary embodiment, the register interface 130 may be a host controller which supports "hot-plug" or "hot-swap" operations (i.e., automatically detecting a physically linked device). The host controller may also support "media-sense." In media-sense, the register set indicates to the partition that the RMS device is always present, but makes the storage media come and go. When the RMS device is unmapped from a partition, the register set indicates that the media is no longer in the RMS device (although the RMS device is still indicated as being attached).

Partitions 120a-c may also be provided with virtual input/output (I/O) controllers 140a-c, respectively (hereinafter also generally referred to as I/O controller 140). Virtual I/O controller 140 may include bus interface logic, address decoding logic, and control logic to manage transactions with the partition 120.

Partitions 120 may be communicatively coupled with one or more shared removable media storage (RMS) devices 150a-b (hereinafter also generally referred to as shared RMS device 150). Shared RMS device 150 may implement storage operations on a removable media 155a-b. For example, shared RMS device 150 may be a DVD drive and the removable media 155 may be DVD discs. Of course, any RMS device 150 may be implemented for storage operations on any of a wide variety of removable media, including but not limited to, optical media, magnetic storage media, and the so-called "memory sticks" and "thumb drives".

In an exemplary embodiment, partitions 120 may be communicatively coupled with the shared RMS devices 150 via a suitable switching fabric 160. The term "switching fabric" as used herein means the hardware and software for moving data in a networking environment by interconnecting a number of ports to establish a connection between one or more network nodes. For example, the switching fabric may be implemented as an Ethernet or Fibre channel (FC) network. Of course other communication media may be also implemented, including, but not limited to, small computer system interface (SCSI), universal serial bus (USB), the 1394 standard (or Firewire®), or other data transfer topologies now known or later developed.

A management processor 170 may be provided on the switching fabric 140 to interface with the partitions 120 and the shared RMS devices 150. Management processor 170 may be implemented in hardware and software (e.g., firmware) to maintain a connection with the shared RMS devices 150, map the shared RMS devices 150 to partitions 120, and schedule access requests to the shared RMS devices 150.

The management processor 170 may also be implemented for other purposes, such as, e.g., monitoring system-wide operations, controlling power functions and hardware such as fans, etc. For example, management processor 170 may record system state information, issue alerts, handle partial or system-wide firmware updates, etc.

In an exemplary embodiment, partitions 120 are logically disconnected from the shared RMS device 150 by default, even though a physical connection may exist (e.g., through the switching fabric 160). A shared RMS device may be mapped to partitions 120 for data access (e.g., read/write operations) on a removable media to establish a logical connection on an as-needed basis.

During operation, a partition 120 may address the management processor 170 and request a shared RMS device 150 be mapped to the partition 120. In an exemplary embodiment, the partition may issue a request via the register interface and virtual I/O controller over the switching fabric. Alternatively, the request may be made out-of-bound (e.g., via the management processor's LAN interface). In any event, the request may identify a particular RMS device.

In an exemplary embodiment, shared RMS devices 150 are mapped to partitions 120, one at a time. The management processor 170 checks availability of the requested RMS device 150, and then maps the shared RMS device 150 to the partition 120 if the RMS device is available. If the requested RMS device 150 is not available (e.g., it is turned off or already in use), the management processor 170 may queue the request.

Management processor 170 may schedule access to a shared RMS device 150 using any of a wide variety of criteria. For example, requests may be queued and retrieved from the queue using a first-in first-out (FIFO), round robin, or prioritized approach, to name only a few examples.

In another exemplary embodiment, the same RMS device 150 may be mapped to more than one partition 120 for simultaneous read-only access by more than one partition (e.g., 120*a*, 120*b*, and 120*c*). According to one such embodiment, management processor 170 may establish a smart cache 180 to handle simultaneous read-only operations.

An exemplary smart cache 180 may be implemented as follows. The management processor 170 may cache read-only queries in local memory to enable fast and simultaneous retrieval by the partitions 120. Each partition 120 is provided with an instance of the smart cache 180.

Other embodiments are also contemplated. For example, multi-partitioned system 100 providing partitions 120 access to shared RMS devices 150 may be implemented for firmware updates (as described in more detail below with reference to FIG. 2), or to write system state information for the multi-partitioned system to removable media 155 (as described in more detail below with reference to FIG. 3). Still other embodiments are also contemplated.

Figure 2:
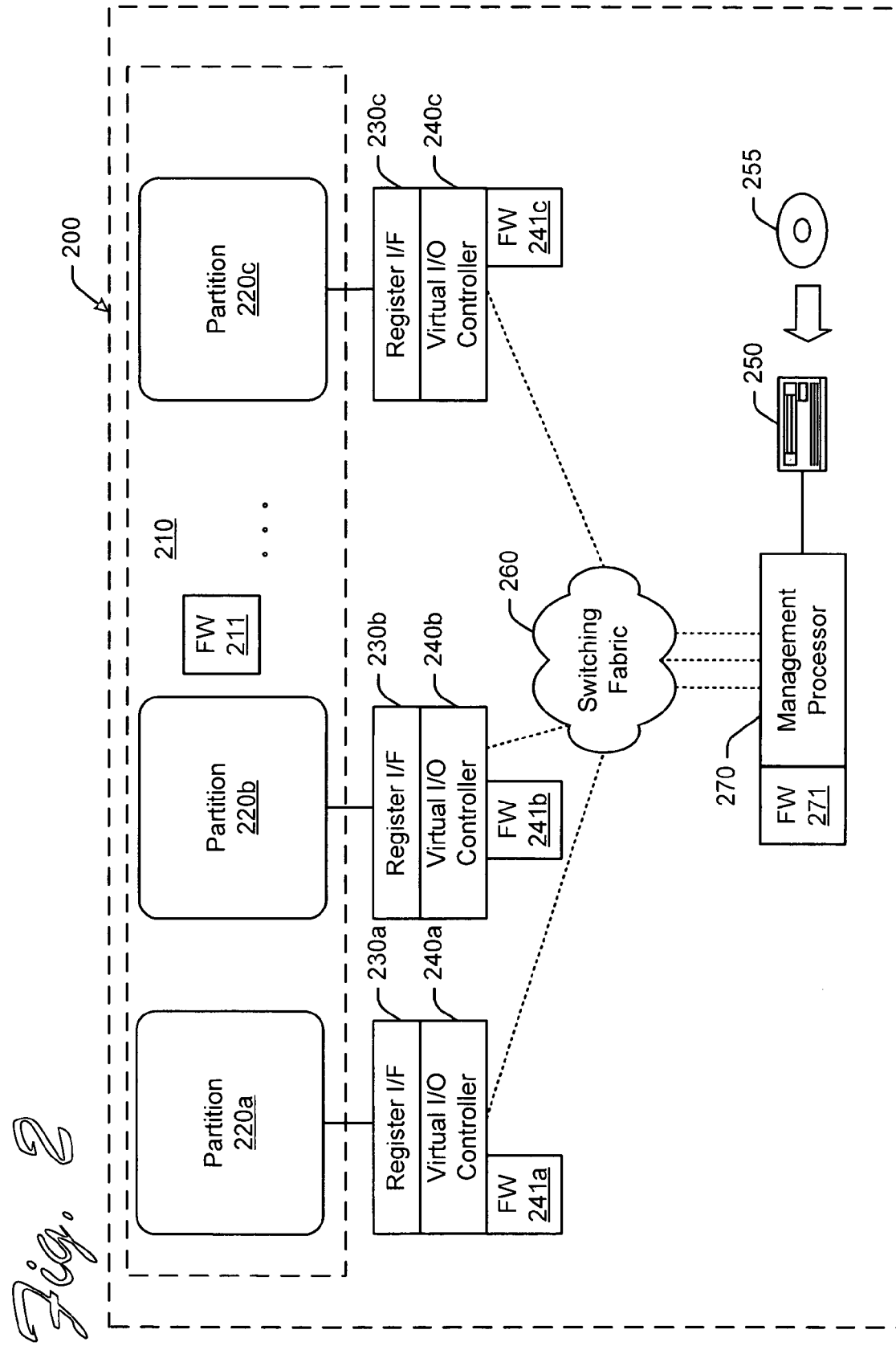
FIG. 2 is a high-level schematic diagram illustrating an exemplary use of removable media in a shared RMS device to update a multi-partitioned system.

FIG. 2 is a high-level schematic diagram illustrating an exemplary shared RMS device implemented to update a multi-partitioned system 200 using removable media. It is noted that 200-series reference numbers corresponding to the 100-series reference numbers in FIG. 1 are used to identify like elements, and accordingly are not each described again for FIG. 2.

Shared RMS device 250 may be mapped directly to the management processor 270. Accordingly, management processor 270 is able to directly handle data access on the removable media 255. In an exemplary embodiment, the management processor 270 may retrieve firmware updates for one or more components in the multi-partitioned system 200. For example, management processor 270 may update firmware 271 for the management processor 270, firmware 241*a-c* for one or more of the virtual I/O controllers 240*a-c*, and/or firmware 211 for the processor 210 (or partitions 220*a-c*).

Figure 3:
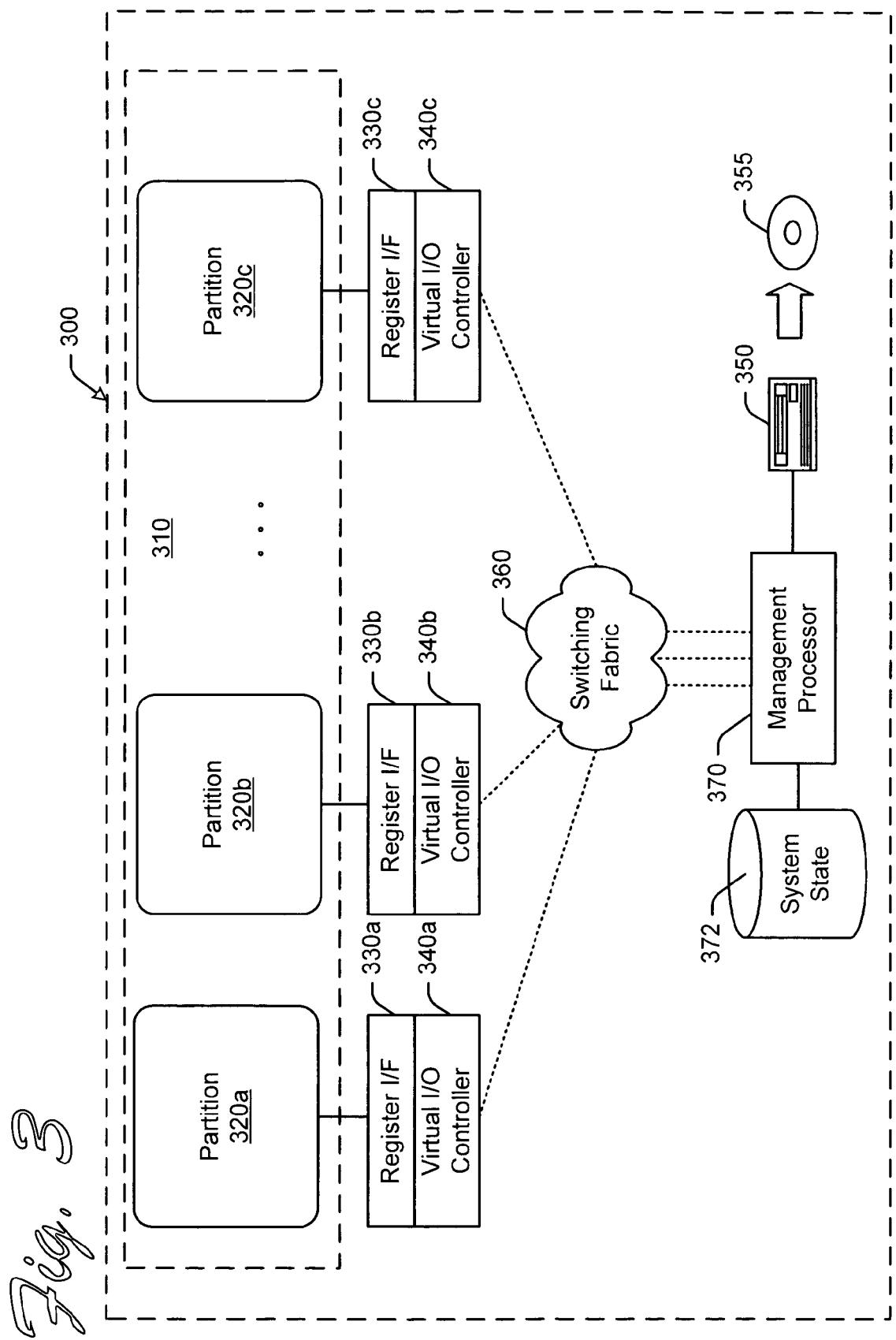
FIG. 3 is a high-level schematic diagram illustrating another exemplary use of removable media in a shared RMS device to write system state information for a multi-partitioned system.

FIG. 3 is a high-level schematic diagram illustrating an exemplary sharable RMS device implemented to write system state for a multi-partitioned system 300 to removable media. Again, it is noted that 300-series reference numbers corresponding to the 100-series reference numbers in FIG. 1 are used to identify like elements, and accordingly are not each described again for FIG. 3.

Shared RMS device 350 may be mapped directly to the management processor 370. Accordingly, management processor 370 is able to directly handle data access on the removable media 355. In an exemplary embodiment, the management processor 370 may write system state information 372 for one or more components in the multi-partitioned system 300 to removable media 355. System state information 372 may include one or more logs, e.g., operational history, alerts, etc. The system state information 372 may be written to one or more removable media 355 so that it can be delivered offsite for technical support or troubleshooting, delivered offsite for storage, maintained as a backup, or transferred to another system, etc.

Figure 4:
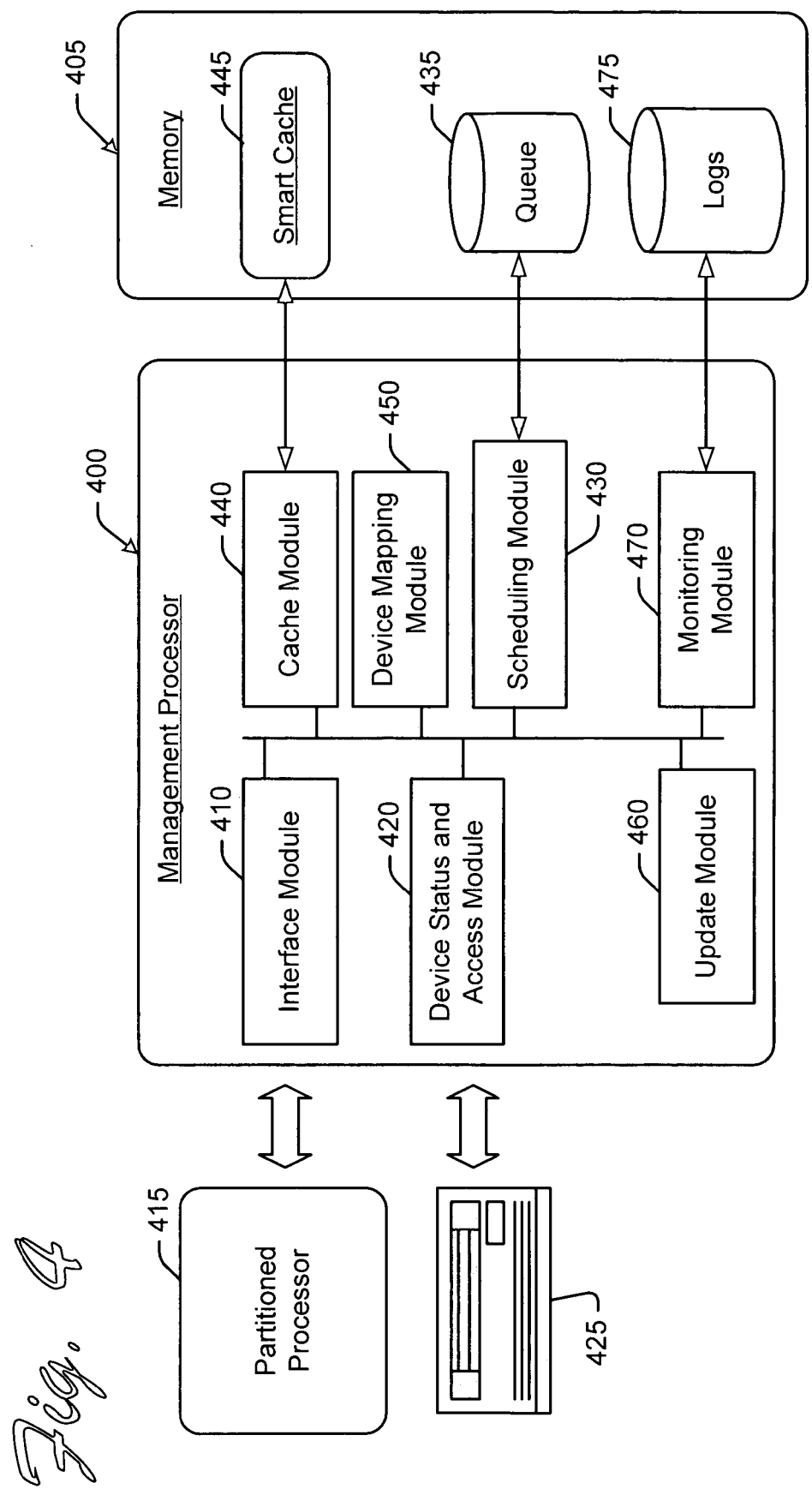
FIG. 4 is a high-level schematic diagram of an exemplary management processor which may be implemented in a multi-partitioned system for sharing RMS devices.

FIG. 4 is a high-level schematic diagram of an exemplary management processor 400 (e.g., management processor 170 in FIG. 1) which may be implemented in a multi-partitioned system for sharing RMS devices. As discussed briefly above, management processor 400 may be implemented in hardware and software (e.g., firmware). FIG. 4 illustrates functional modules which may be implemented in software (or firmware) as logic instructions.

Management processor 400 may include an interface module 410. Interface module 410 may be implemented to interface with a partitioned processor 415 in a multi-partitioned system (e.g., having partitions 120 as shown in FIG. 1). For example, interface module 410 may handle requests from the partitions to access a shared RMS device 425 (e.g., one of the RMS devices 150 in FIG. 1). Interface module 410 may also issue mapping commands to map the shared RMS device 425 to the partitioned processor 415, and logically disconnect or unmap the shared RMS device 425 (e.g., when the RMS device is no longer in use by a partition).

Management processor 400 may also include a device status and access module 420. Device status and access module may be implemented to monitor the status of the shared RMS device 425 and access thereto by partitions. For example, device status and access module 420 may be to determine if a shared RMS device 425 is added or has been taken offline, if a shared RMS device 425 is busy or otherwise unavailable, in addition to the handling other information for the RMS devices 425 (e.g., device type and addressing).

Management processor 400 may also include a scheduling module 430. Scheduling module 430 may be implemented with a queue 435 in memory 405 operatively associated with the management processor 400. For example, if more than one partition requests access to a shared RMS device, the scheduling module may add requests to the queue 435 and schedule access to the RMS device 425.

Management processor 400 may also include a cache module 440. Cache module 440 may be implemented to establish a smart cache 445 so that more than one partition may be connected to the same RMS device 425 with other partitions. For example, enabling a smart cache 445 for read-only operations was discussed above with reference to FIG. 1.

Management processor 400 may also include a device mapping module 450. Device mapping module 450 may be implemented to map the shared RMS devices to the partitions, e.g., to route signals between the partition and one of the RMS devices for storage operations. Device mapping module 450 may also be implemented to map one or more shared RMS devices directly to the management processor 400, as discussed in more detail above with reference to FIGS. 2 and 3.

Management processor 400 may also include an update module 460. Update module 460 may be implemented to handle firmware updates for one or more modules in the multi-partitioned system, as discussed above with reference to FIG. 2.

Management processor 400 may also include a monitoring module 470. Monitoring module 470 may be implemented to monitor system-wide operations, the status and/or health of various devices in the system, etc. Monitoring module 470 may also be implemented to write one or more logs 475 to memory 405, and to retrieve system state information, e.g., to write to removable media as discussed above with reference to FIG. 3.

Management processor 400 may also include other modules, not shown, to implement other functions in the multi-partitioned system. For example, management processor 400 may include modules to control power functions and hardware such as fans, etc.

It is noted that exemplary management processor 400 is shown and described herein merely for purposes of illustration and is not intended to be limited to any particular implementation. For example, the modules do not need to be encapsulated as the separate functional components shown in FIG. 4. In addition, other functional components may also be provided and are not limited to those shown and described herein.

Before continuing, it should be understood that the exemplary embodiments discussed above are provided for purposes of illustration and are not intended to be limiting. Still other implementations are also contemplated.

Exemplary Operations

Figure 5:
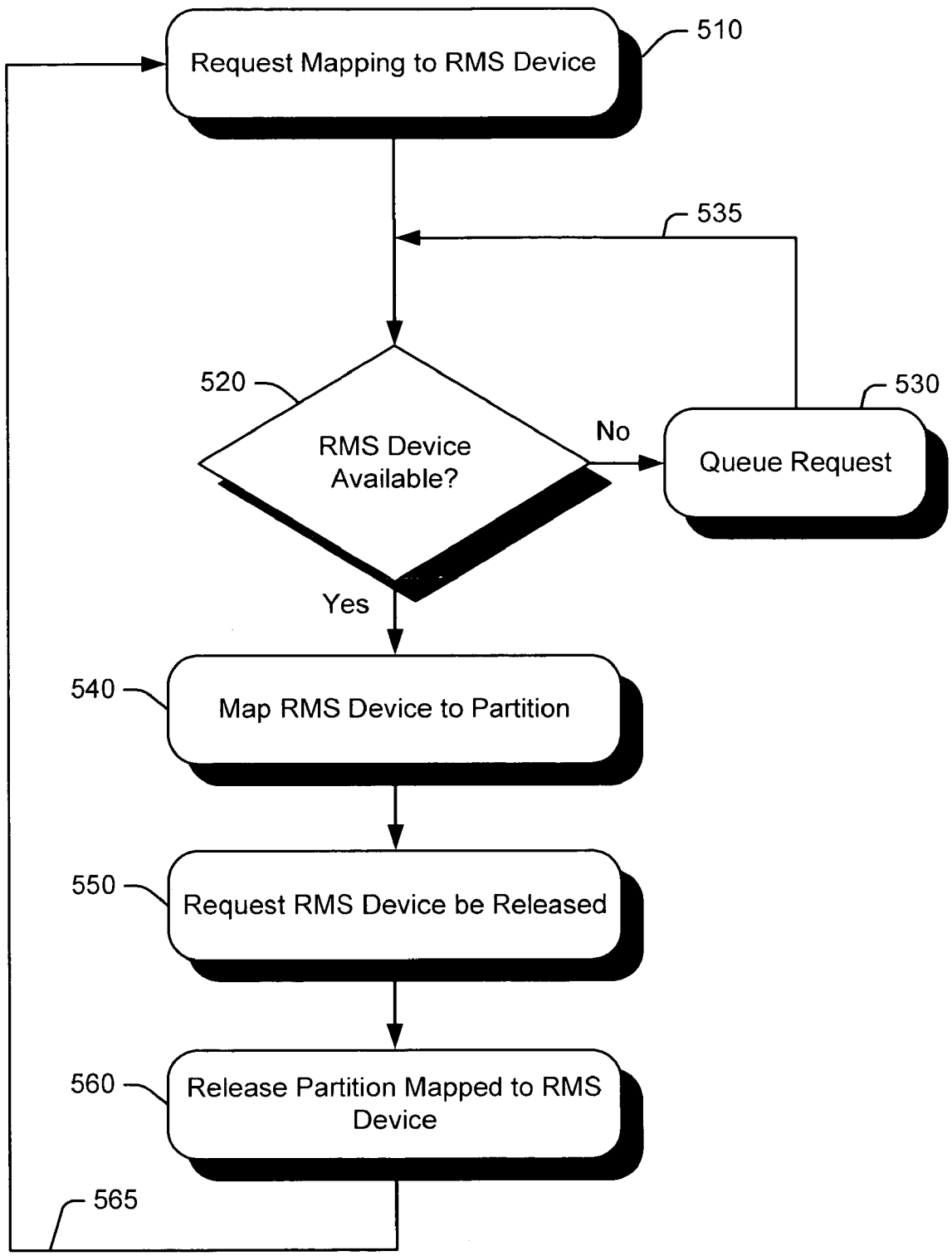
FIG. 5 is a flowchart illustrating exemplary operations to implement sharing RMS devices in a multi-partitioned system.
Figure 6:
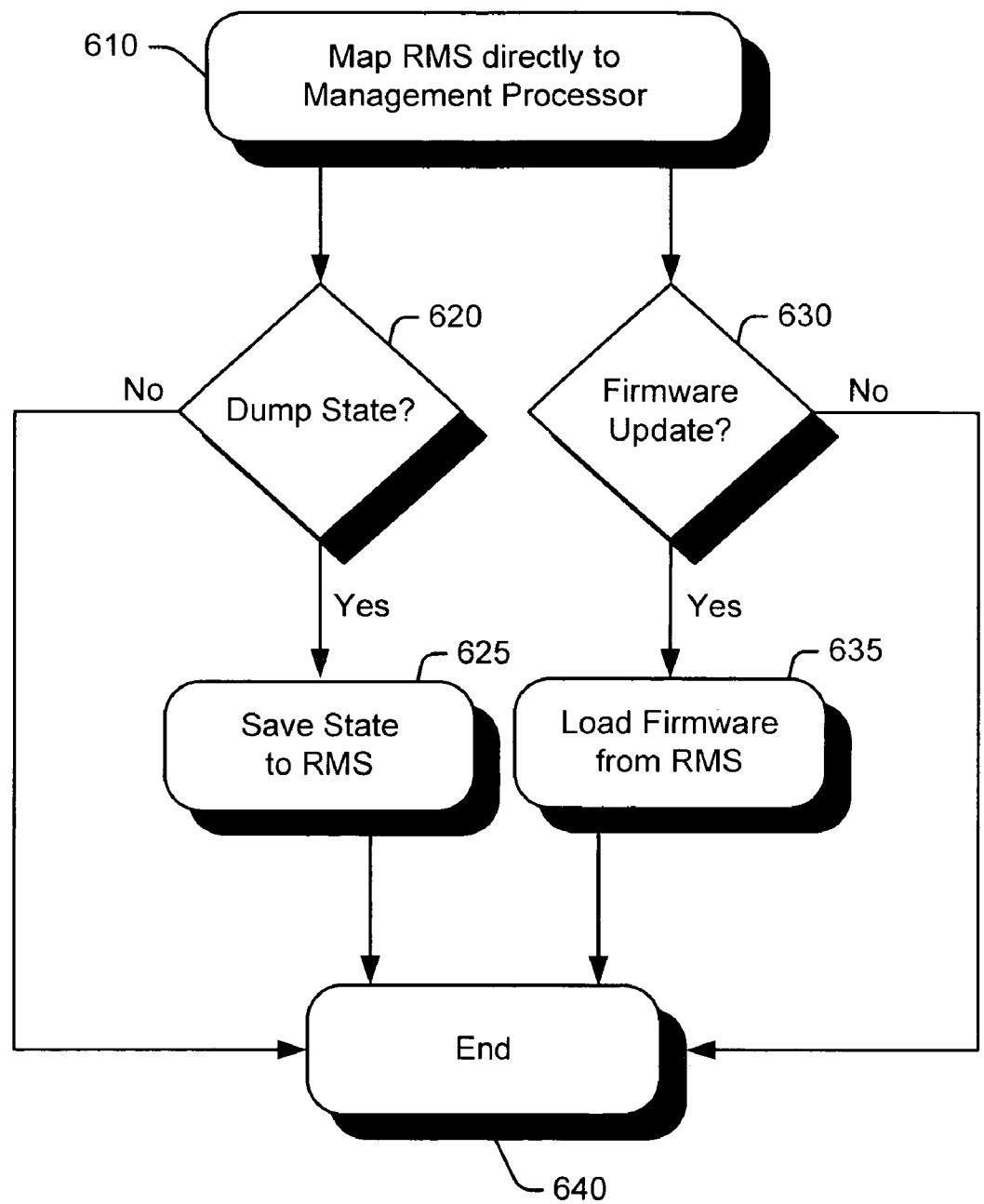
FIG. 6 is a flowchart illustrating exemplary operations to implement firmware updates and/or writing system state information using a shared RMS device in a multi-partitioned system.

FIGS. 5 and 6 are flowcharts illustrating exemplary operations to implement sharing removable media storage (RMS) devices in multi-partitioned systems. The operations may be embodied as logic instructions on one or more computer-readable media. The logic instructions may be executed on one or more processing units to implement the described operations. In an exemplary embodiment, the components and connections depicted in the figures may be used to implement sharing removable media storage in multi-partitioned systems.

FIG. 5 is a flowchart illustrating exemplary operations 500 to implement sharing RMS devices in a multi-partitioned system. In operation 510 a request is made to map a shared RMS device to a partition in the multi-partitioned system. In operation 520, a decision is made whether the shared RMS device is available. If the shared RMS device is not available, the request may be queued in operation 530. Operations may loop as illustrated by arrow 535 to again determine whether the shared RMS device is available in operation 520.

If the shared RMS device is available in operation 520, the shared RMS device may be mapped to the partition in operation 540. For example, the shared RMS device may be exclusively mapped to the partition for independent access to removable media in the shared RMS device. Alternatively, a smart cache may be established to support simultaneous access to the shared RMS device by more than one partition.

In operation 550, the partition may request the RMS device be released (or "unmapped"). In operation 560 the mapped RMS device may be released, e.g., by releasing a logical connection between the partition and the shared RMS device. Accordingly, the shared RMS device may be mapped to other partitions for exclusive access, e.g., by returning to operation 510 as illustrated by arrow 565, or to other requests that were queued in operation 530.

FIG. 6 is a flowchart illustrating exemplary operations 600 to implement firmware updates and writing system state information using removable media in a multi-partitioned system. In operation 610, a shared RMS device may be mapped directly to a management processor. The management processor may then be implemented to enable various storage operations.

By way of illustration, a decision may be made in operation 620 to "dump state" for the multi-partitioned system. A user may write system state information to removable media in the RMS device in operation 625. For example, a customer may send the removable media with system state information to a service center for troubleshooting. Or for example, a user may store system state information on the removable media for backup purposes. Operations may end at 640.

By way of further illustration, a decision may be made in operation 630 to update firmware in the multi-partitioned system. Firmware may be updated in operation 635, e.g., for the management processor, and/or any one or more of the virtual I/O controllers, register interfaces, and/or partitions in the multi-partitioned system. Operations may end at 640.

The operations shown and described herein are provided to illustrate exemplary embodiments of sharing RMS devices in multi-partitioned systems. It is noted that the operations are not limited to the ordering shown. Still other operations may also be implemented to enable sharing RMS devices in multi-partitioned systems.

In addition to the specific embodiments explicitly set forth herein, other aspects and implementations will be apparent to those skilled in the art from consideration of the specification disclosed herein. It is intended that the specification and illustrated embodiments be considered as examples only.

The invention claimed is:

1. A multi-partitioned system with shared removable media storage (RMS), comprising:
   a processor having a plurality of partitions;
   at least one shared RMS device provided for the plurality of partitions, the at least one shared RMS device logically disconnected from the plurality of partitions by default;
   a management processor addressable by the plurality of partitions, the management processor mapping the same shared RMS device to the plurality of partitions independent of one another for data access operations; and
   a virtual input/output (I/O) controller provided in the address space of each of the plurality of partitions, the virtual I/O controller handling communications between the respective partition and the management processor.

2. The system of claim 1 further comprising a switching fabric for linking the partitions to the at least one shared RMS device via the management processor on a requested basis.

3. The system of claim 1 further comprising a register interface for each of the partitions, the register interface supporting hot-plug operations for the at least one shared RMS device.

4. The system of claim 1 further comprising a register interface for each of the partitions, the register interface supporting media-sense operations for the at least one shared RMS device.

5. The system of claim 1 wherein the management processor is operatively associated with a queue for scheduling access to the at least one shared RMS device by more than one partition.

6. The system of claim 1 wherein the management processor logically disconnects a partition from the at least one shared RMS device before mapping the same shared RMS device to another partition.

7. The system of claim 1 wherein the management processor logically disconnects a partition from the at least one shared RMS device when the partition is finished with a data access operation.

8. The system of claim 1 wherein the management processor establishes a smart cache for mapping the at least one shared RMS device to more than one partition for read-only operations.

9. The system of claim 1 wherein the at least one shared RMS device is mapped directly to the management processor for system-wide firmware install operations.

10. The system of claim 1 wherein the at least one shared RMS device is mapped directly to the management processor for writing system state information to a removable storage media in the at least one shared RMS device.

11. A multi-partitioned system with shared removable media storage (RMS), comprising:
    a processor having a plurality of partitions;
    at least one shared RMS device provided for the plurality of partitions, the at least one shared RMS device logically disconnected from the plurality of partitions by default; and
    a management processor addressable by the plurality of partitions, the management processor mapping the same shared RMS device to the plurality of partitions independent of one another for data access operations, wherein the management processor logically disconnects a partition from the at least one shared RMS device before mapping the same shared RMS device to another partition.

12. The system of claim 11 further comprising a switching fabric for linking the partitions to the at least one shared RMS device via the management processor on a requested basis.

13. The system of claim 11 further comprising a virtual input/output (I/O) controller provided in the address space of each of the plurality of partitions, the virtual I/O controller handling communications between the respective partition and the management processor.

14. The system of claim 11 further comprising a register interface for each of the partitions, the register interface supporting hot-plug operations for the at least one shared RMS device.

15. The system of claim 11 further comprising a resister interface for each of the partitions, the register interface supporting media-sense operations for the at least one shared RMS device.

16. The system of claim 11 wherein the management processor is operatively associated with a queue for scheduling access to the at least one shared RMS device by more than one partition.

17. The system of claim 11 wherein the management processor logically disconnects a partition from the at least one shared RMS device when the partition is finished with a data access operation.

18. The system of claim 11 wherein the management processor establishes a smart cache for mapping the at least one shared RMS device to more than one partition for read-only operations.

19. The system of claim 11 wherein the at least one shared RMS device is mapped directly to the management processor for system-wide firmware install operations.

20. The system of claim 11 wherein the at least one shared RMS device is mapped directly to the management processor for writing system state information to a removable storage media in the at least one shared RMS device.

21. A multi-partitioned system with shared removable media storage (RMS), comprising:
    a processor having a plurality of partitions;
    at least one shared RMS device provided for the plurality of partitions, the at least one shared RMS device logically disconnected from the plurality of partitions by default; and
    a management processor addressable by the plurality of partitions, the management processor mapping the same shared RMS device to the plurality of partitions independent of one another for data access operations, wherein the at least one shared RMS device is mapped directly to the management processor for writing system state information to a removable storage media in the at least one shared RMS device.

22. The system of claim 21 further comprising a switching fabric for linking the partitions to the at least one shared RMS device via the management processor on a requested basis.

23. The system of claim 21 further comprising a virtual input/output (I/O) controller provided in the address space of each of the plurality of partitions, the virtual I/O controller handling communications between the respective partition and the management processor.

24. The system of claim 21 further comprising a register interface for each of the partitions, the register interface supporting hot-plug operations for the at least one shared RMS device.

25. The system of claim 21 further comprising a register interface for each of the partitions, the register interface supporting media-sense operations for the at least one shared RMS device.

26. The system of claim 21 wherein the management processor is operatively associated with a queue for scheduling access to the at least one shared RMS device by more than one partition.

27. The system of claim 21 wherein the management processor logically disconnects a partition from the at least one shared RMS device before mapping the same shared RMS device to another partition.

28. The system of claim 21 wherein the management processor logically disconnects a partition from the at least one shared RMS device when the partition is finished with a data access operation.

29. The system of claim 21 wherein the management processor establishes a smart cache for mapping the at least one shared RMS device to more than one partition for read-only operations.

30. The system of claim 21 wherein the at least one shared RMS device is mapped directly to the management processor for system-wide firmware install operations.

* * * * *

UNITED STATES PATENT AND TRADEMARK OFFICE
CERTIFICATE OF CORRECTION

PATENT NO. : 7,370,157 B2  
APPLICATION NO. : 11/135706  
DATED : May 6, 2008  
INVENTOR(S) : Daniel V. Zilavy et al.

Page 1 of 1

It is certified that error appears in the above-identified patent and that said Letters Patent is hereby corrected as shown below:

In column 8, line 19, in Claim 15, delete "resister" and insert -- register --, therefor.

Signed and Sealed this

Fifth Day of August, 2008

JON W. DUDAS  
*Director of the United States Patent and Trademark Office*